(12) United States Patent
Suzuki

(10) Patent No.: US 6,513,744 B2
(45) Date of Patent: Feb. 4, 2003

(54) THREADING APPARATUS FOR MAGNETIC TAPE

(75) Inventor: Takeshi Suzuki, Yamagata (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/726,115

(22) Filed: Nov. 30, 2000

(65) Prior Publication Data
US 2001/0004092 A1 Jun. 21, 2001

(30) Foreign Application Priority Data
Dec. 21, 1999 (JP) .......................... 11-363162

(51) Int. Cl.⁷ .............................................. G11B 15/66
(52) U.S. Cl. .................................................. 242/332.4
(58) Field of Search ........................ 242/332.4, 348.2; 360/93

(56) References Cited

U.S. PATENT DOCUMENTS

| | | | | |
|---|---|---|---|---|
| 4,399,936 A | * | 8/1983 | Rueger | 226/92 |
| 4,679,747 A | * | 7/1987 | Smith | 242/332.4 |
| 4,828,201 A | * | 5/1989 | Smith | 242/332.4 |
| 5,542,620 A | * | 8/1996 | Ohshita | 242/332.4 |
| 6,067,211 A | * | 5/2000 | Chliwnyj et al. | 360/128 |

FOREIGN PATENT DOCUMENTS

| | | |
|---|---|---|
| JP | 4-76849 | 3/1992 |
| JP | 5-225660 | 9/1993 |

* cited by examiner

Primary Examiner—Donald P. Walsh
Assistant Examiner—Joseph C Rodriguez
(74) Attorney, Agent, or Firm—Sughrue Mion, PLLC

(57) ABSTRACT

A threading mechanism for a magnetic tape machine is contrived so as to obtain sufficient driving power when the threading arm is latched with a leader block at a position where the leader block is stopped in a cartridge or a machine reel, and is also contrived so as to avoid impact force based on a driving motor even when the threading arm stops suddenly at the stop position. The positions where the leader block is stopped in the cartridge and the machine reel are inside a track of the threading arm which swings around its pivoting point and the leader block is threaded therebetween. A driving arm for swinging the threading arm is motor-driven around a pivoting point of the driving arm itself. The driving arm causes the threading arm to work together between the positions where the leader block is stopped, and cancels the working with the threading arm in the direction of the trace over the disengaging positions, so as to be swung.

7 Claims, 5 Drawing Sheets

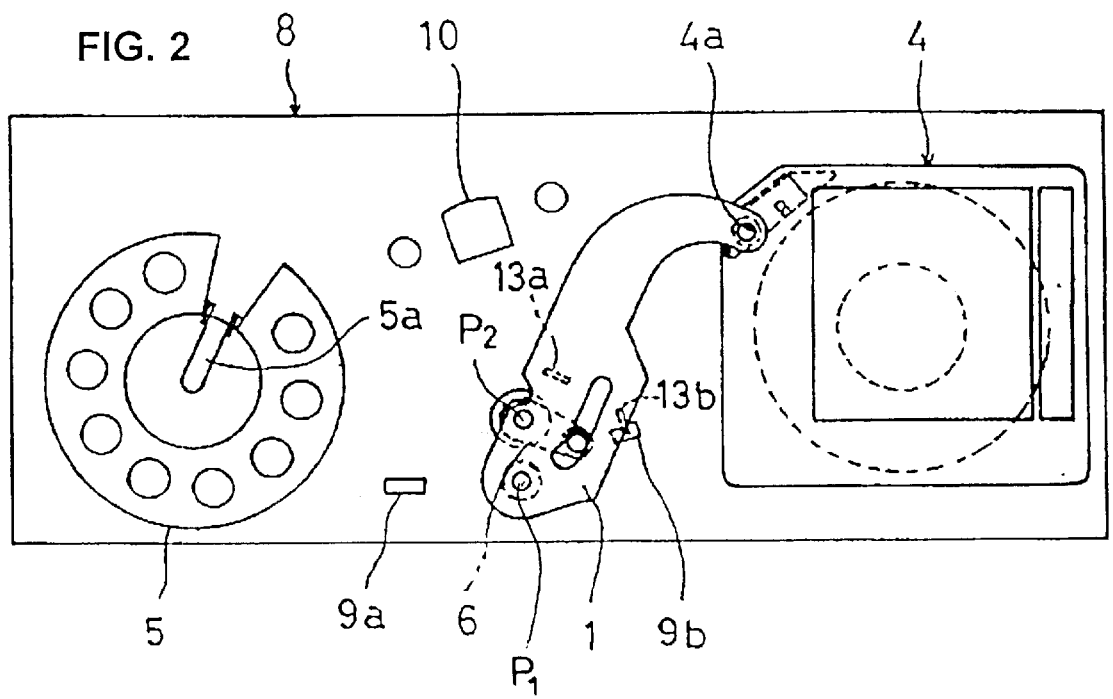

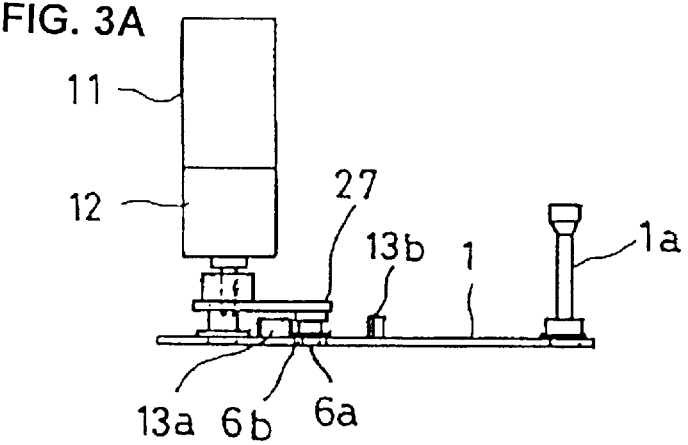
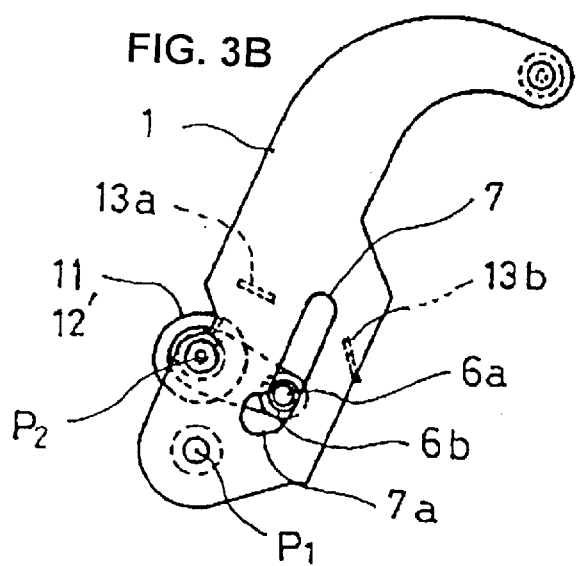
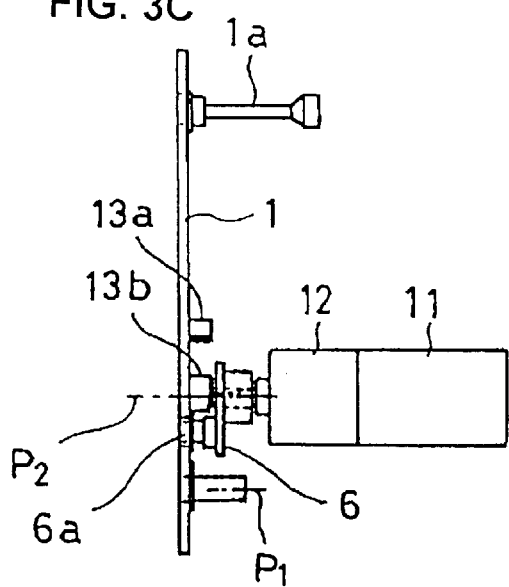

THREADING APPARATUS FOR MAGNETIC TAPE

BACKGROUND OF THE INVENTION

1. Technical Field of the Invention

The present invention relates to a threading apparatus for magnetic tape which carries a leader block provided at the end of a recording medium in a tape form from a cartridge for the recording medium to a machine reel through a threading arm, and returns the leader block to the cartridge when the medium is wound off from the machine reel.

2. Description of the Prior Art

A threading arm of a conventional magnetic tape apparatus is generally driven through gears by means of a driving motor in a threading mechanism for carrying a leader block of a recording medium in a tape form from a cartridge for the recording medium to a machine reel. The driving power becomes maximum, when the leader block is latched with a pin of the threading arm or held by means of the pin and is threaded at the position where the leader block is stopped in the cartridge and the machine reel. Further, it is necessary to stop the threading arm, when the leader block stops after carrying the leader block to the stop position However, in view of the performance of the motor, it is impossible to start the driving of the driving motor at the above-mentioned stop position and immediately give the maximum power to the threading arm. The driving motor and the threading arm are worked together, so that it is necessary to stop the driving motor when the leader block reaches the stop position. However, when the threading arm is suddenly stopped, the position thereof is checked with a position sensor and subsequently the driving motor is stopped. Therefore, a little time lag is caused, and impact force is applied to the gears, which constitute a power transmission system. For this reason, in order to keep the strength of the gears, it is necessary to subject the gears to hardening or the like for increasing the size, the thickness or the hardness of the gears. Thus, it is difficult to make the gears small-sized, and costs increase.

There is known a mechanism wherein an elastic mechanism or an elastic material is fitted to the middle of a threading arm to relieve impact force, as shown in a given mechanism disclosed in JP 04-076849 A (1992). However, in order to move the elastic mechanism only in the axial direction of the threading arm, it is essential to use an additional mechanism such as a slide axis and a straight bearing. Thus, costs of this mechanism increase. In order to simultaneously attain the ensuring of driving power upon the latch of the leader block and the relief of the impact force upon the sudden stop thereof at the stop position in the cartridge or the machine reel, the arrangement thereof undergoes considerable restriction. Thus, it is difficult to solve this problem.

SUMMARY OF THE INVENTION

An object of the present invention is to provide a threading mechanism in a magnetic tape machine, making it possible to obtain sufficient driving power when the threading mechanism, which is for carrying a leader block in a recording medium in a tape form from a cartridge for the recording medium to a machine reel at the side of the machine, causes the leader block to be held by means of the threading arm or be kept at the threading arm; and making it possible to avoid impact force from a driving motor in spite of sudden stop of the threading arm at the above-mentioned stop position.

Therefore, the present invention is a threading mechanism in a magnetic tape machine, made so as to supply a leader block arranged at the end of a recording medium in a tape form from a cartridge for the recording medium to a machine reel through a threading arm, and so as to conversely return the leader block to the cartridge when the medium is wound off from the machine reel, characterized in that the threading arm is made so that positions where the leader block is stopped in the cartridge and the machine reel are inside a track of the threading arm which swings around its pivoting point and the leader block is threaded therebetween, and a driving arm for swinging the threading arm has a structure motor-driven around a pivoting point of the driving itself, causes the threading arm to work together between the positions where the leader block is stopped, and cancels the working with the threading arm in the direction of the trace over the stop positions, so as to be swung.

In this case, as embodiments of the present invention, the following structures are effective: a cam groove is made in the threading arm, a guide pin provided to the driving arm is inserted into the cam groove, the two are engaged with each other in the swinging direction of the threading arm between the leader block stop positions, in a trace over the stop positions, a disengaging area for canceling the engagement with the guide pin is formed; the disengaging area is made by a groove portion extending along the direction tangential to the rotation radius of the driving arm from the guide pin; position sensors are provided to a body of the machine, corresponding to the stop positions, respectively, and when the driving arm is operated in the direction of the trace over the stop positions, the position sensors function so that motor-driving of the driving arm is stopped; and the motor for operating the driving arm is a motor with an encoder, and pulses from the encoder are managed to control speed of the driving arm or to reduce the speed at the stop positions.

Accordingly, at the time of latching with the leader block, the leader block beforehand receives rotating power of the driven driving motor, so that sufficient power can be obtained. At the time of sudden stop of the threading arm at the stop positions, it is possible to obtain an effect that impact force based on the driving motor can be avoided.

According to the present invention, a first effect thereof is that impact force is not applied to the threading mechanism, the driving power transmission system connected to the driving motor, for example, gears such as reduction gears. For this reason, endurance of the machine can be improved.

A second effect thereof is that driving torque of the driving motor can be made small. This is because when the operation of the threading arm starts at the position to which the maximum load is applied in the threading mechanism, that is, at the leader block stop position, the movement of the driving arm has a play so that the rotation speed of the driving motor can be beforehand raised.

Furthermore, a third effect thereof is that the threading mechanism can be made small-sized at lower costs. This is because the motor torque can be reduced as described above so that excessive load is not applied to a power transmission system such as gears.

BRIEF EXPLANATION OF THE DRAWINGS

FIG. 2 is a plan view showing the whole of the embodiment of the present invention.

FIG. 3A is an enlarged front view showing a main portion of the embodiment of the present invention. same.

FIG. 3B is an enlarged plan view, and an enlarged side view showing a main portion of the embodiment of the present invention.

FIG. 3C is an enlarged side view showing a main portion of the embodiment of the present invention.

PREFERRED EMBODIMENT OF THE INVENTION

Figure 1A:
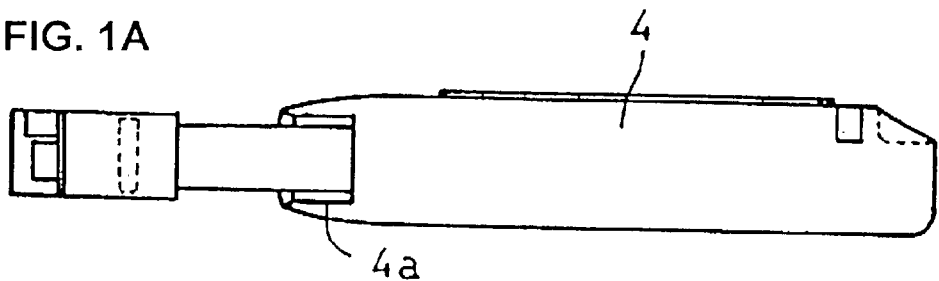
FIG. 1A is a side view of a recording medium and a cartridge for the medium used in an embodiment of the present invention.
Figure 1B:
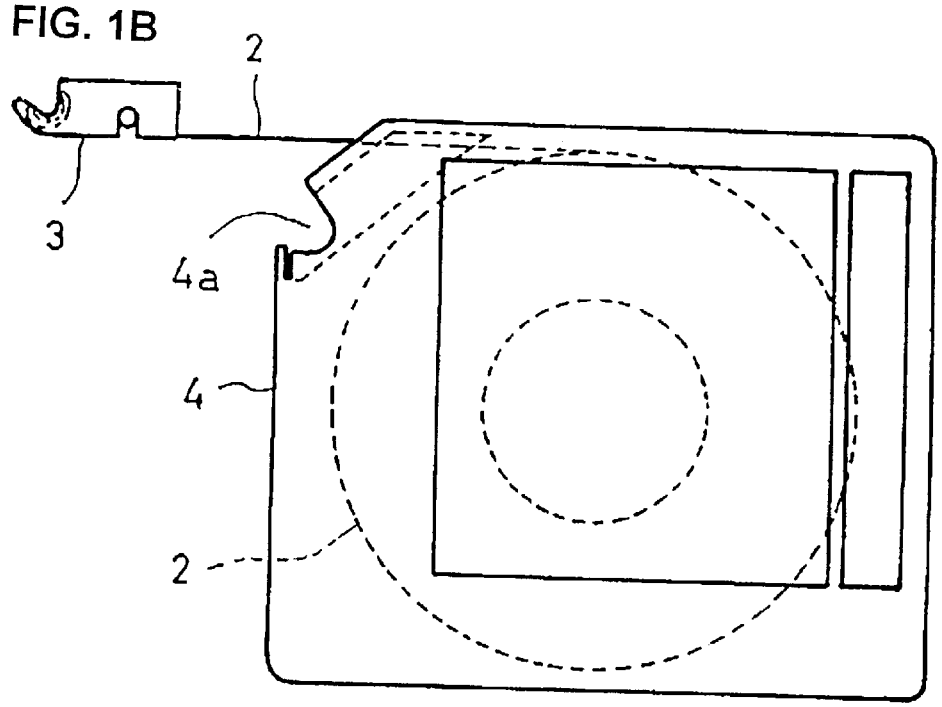
FIG. 1B is a plan view of the recording medium and the cartridge for the medium used in an embodiment of the present invention.
Figure 1C:
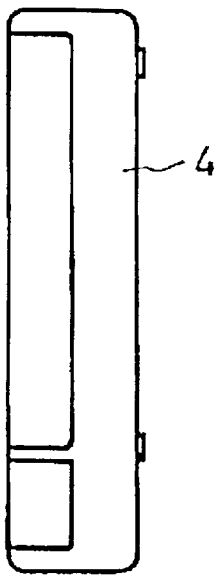
FIG. 1C is an end view of the cartridge for the medium used in an embodiment of the present invention.

Embodiments of the present invention will be specifically explained hereinafter, referring to drawings. As shown in FIGS. 1A, 1B, 1C, 2, 3A, 3B and 3C, the threading mechanism herein is basically made so as to supply a leader block 3 arranged at the end of a recording medium 2 in a tape form from a cartridge 4 for the recording medium 2 to a machine reel 5 through a threading arm 1, and so as to conversely return the leader block 3 to the cartridge 4 when the medium is wound off from the machine reel 5. This is adopted in, for example, a ½ inch magnetic tape machine.

Threading pin 1a at the tip of the threading arm 1 is engaged/disengaged or held in the cartridge 4 and the machine reel 5 at points on a trace of the arm 1 swinging around its pivoting point $P_1$.

A driving arm 6 for swinging the threading arm 1 is made to be motor-driven around a pivoting point $P_2$ (which is positioned at the side of the trace of the swinging threading arm 1 apart a given distance in this embodiment) of the driving arm itself. The driving arm causes the threading arm 1 to work together between the above-mentioned leader block stop positions, and further cancels the working with the threading arm 1 in the direction of the trace over the stop positions, so as to be swung.

More specifically, as shown in FIG. 3B, a cam groove 7 is formed in the threading arm 1. A guide pin 6a provided to the driving arm 6 is inserted into the cam groove 7 through a bearing 6b. The two are engaged with each other in the swinging direction of the threading arm 1 between the leader block stop positions. In the trace over the stop positions, a disengaging area 7a for canceling the engagement with the guide pin 6a is made to continue to a straight portion of the cam groove 7. In particular this embodiment, this disengaging area 7a is made as a groove portion extending along the direction tangential to the rotation radius of the driving arm 6 from the guide pin 6a.

Position sensors 9a and 9b as shown in FIG. 2 are provided to a machine body 8 of the machine, corresponding to the stop positions, respectively. When the driving arm 6 is operated in the direction of the trace over the stop positions, this operation is detected so that the motor-driving of the driving arm 6 is stopped through a control system (not shown).

In the drawings, reference numeral 10 represents a magnetic recording/reproducing head disposed in the machine body 8 along the swinging trace. A driving motor 11 for operating the driving arm 6 is a motor with an encoder. The above-mentioned control system is made to manage pulses from the encoder to control the speed of the driving arm 6 and reduce the speed at the stop positions. Reference numeral 12 represents reduction gears (a driving power transmission system) disposed at the output side of the driving motor 11. Flags 13a and 13b are provided to the threading arm 1, correspondingly to the position sensors 9a and 9b, respectively, and function to give detection signals to the respective position sensors at the respective stop positions.

Figure 4:
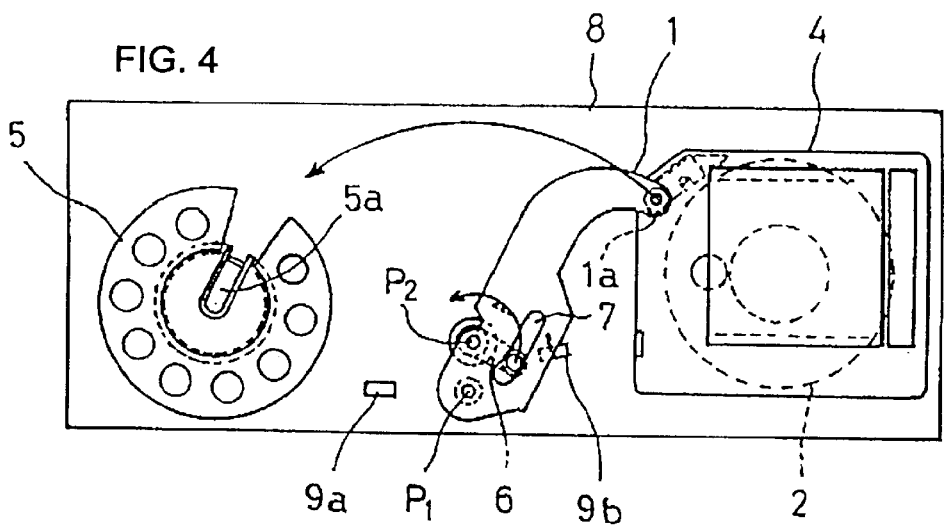
FIG. 4 is an operation-explaining view showing threading operation in the present invention.
Figure 5:
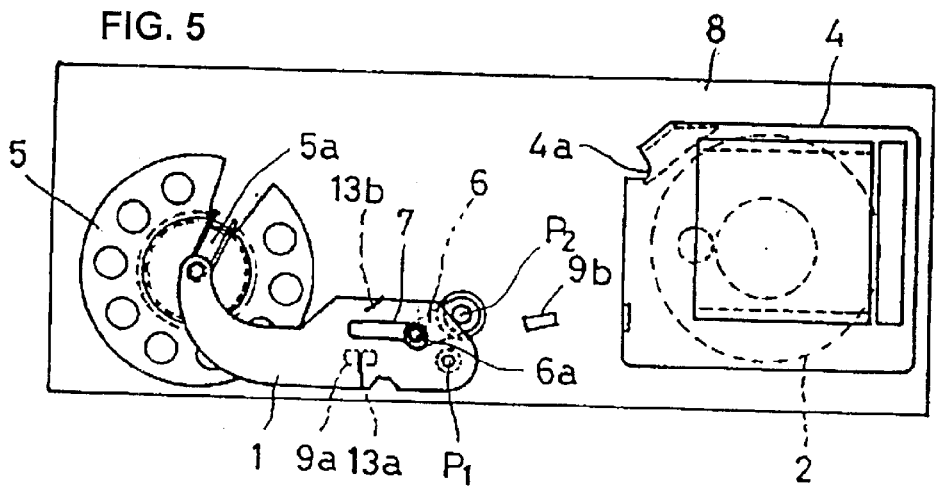
FIG. 5 is an operation-explaining view showing threading operation in the present invention.
Figure 6:
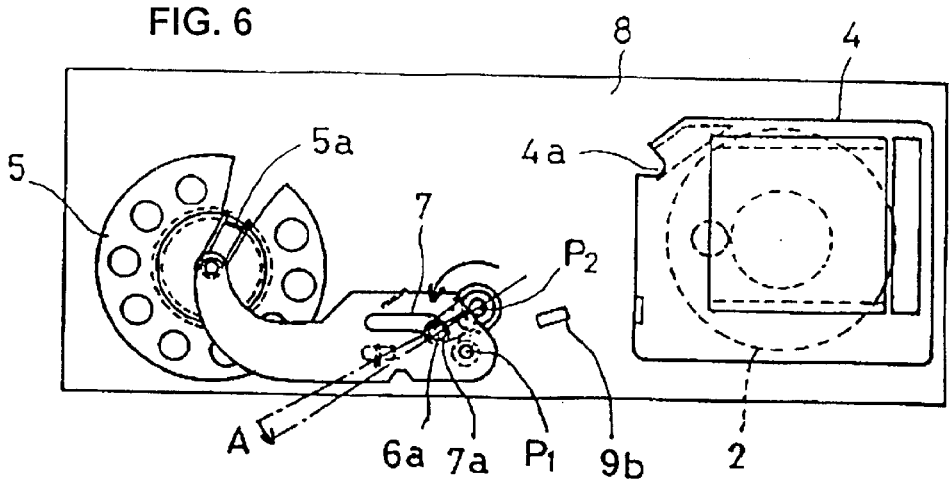
FIG. 6 is an operation-explaining view showing threading operation in the present invention.

As shown in FIGS. 4 to 6, the leader block 3 is threaded from a leader block holding position 4a (that is, one of the stop positions) in the cartridge 4 to a leader block holding position 5a (that is, the other of the stop positions) in the machine reel 5 by the swinging of the threading arm 1.

FIG. 4 shows the threading start position at the time of recording on and reproducing from the magnetic recording medium. When the cartridge 4 on which the recording medium 2 is wound is inserted into an opening of the machine body 8, the cartridge 4 is taken in the machine body 8 by means of an appropriate loading mechanism (not shown). At this time, the leader block 3 of the recording medium 2 is positioned to be engaged with the threading pin 1a. The leader block 3 is rotatably engaged with the threading pin 1a by means of engaging means (not shown) fitted to the threading arm 1. When the driving motor 11 is rotated at this stage, the driving arm 6 is rotated through the reduction gears 12.

At this stage, the guide pin 6a fitted to the driving arm 6 and the bearing 6b are present in the disengaging area 7a in the cam groove 7. Even if the driving arm 6 is rotated by the driving motor 11, the guide pin 6a is not engaged with the threading arm 1. During this time, the driving motor 11 raises its rotation speed, and ensures driving power necessary for swinging the threading arm 1.

Next, the guide pin 6a advances from the disengaging area 7a to the straight portion of the cam groove 7 through the bearing 6b. As a result, the cam groove 7 and the guide pin 6a (the bearing 6b) are engaged with each other in the swinging direction of the threading arm 1. By the (counterclockwise) rotation of the driving arm 6, the threading arm 1 swings in the direction of an arrow.

FIG. 5 shows the state that the leader block 3 is carried to the machine reel 5 by the swinging of the threading arm 1. Herein, the position sensor 9a detects the flag 13a, and stops the driving of the motor through the control system (not shown). At this position, the guide pin 6a (the bearing 6b) finishes the engagement thereof with the cam groove 7 so as to return and be at the inlet of the disengaging area 7a of the cam groove 7. Therefore, the stop of the motor-driving delays slightly.

Thus, as shown in FIG. 6, even if the driving arm 6 continues rotating, the guide pin 6a (the bearing 6b) is conducted to the disengaging area 7a and the threading arm 1 stops at the leader block holding position 5a (the stop position) in the machine reel 5 (see arrow A) without swinging the threading arm 1 by the driving arm 6. At this position, the threading pin 1a is at the center of the rotation of the machine reel 5. In this way, the machine reel 5 is rotated in the state that the leader block 3 is held at the machine reel 5. In the step of this rotation, recording/ reproducing is performed by operation of the magnetic recording/reproducing head 10.

Herein, the driving motor 11 is stopped with a little delay after the stop of the threading arm 1. Therefore, the engagement of the driving arm 6 with the threading arm 1 is already canceled. Thus, it is not feared that impact force following sudden stop is applied to the threading arm 1 and the like.

Conversely, the recording medium 2 is wound back from the machine reel 5 to the cartridge at the stage when the recording/reproducing ends. At the final stage thereof, the threading mechanism functions again. This state will be specifically explained, referring to FIGS. 7 to 9.

Figure 7:
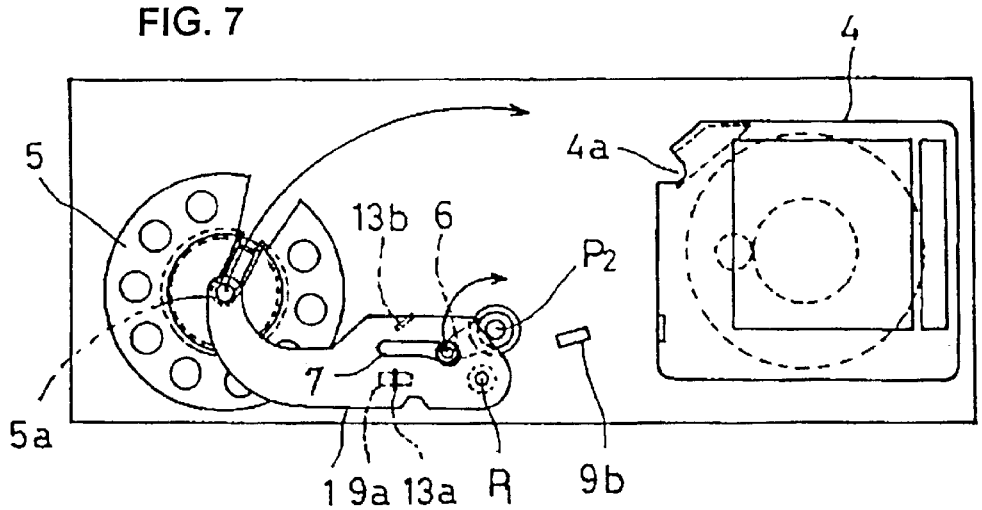
FIG. 7 an operation-explaining view showing unthreading operation in the present invention.

FIG. 7 shows an unthreading start position of the threading mechanism. This is the same state as shown in FIG. 6. At this stage (the above-mentioned final stage), the leader block 3 is rotatably engaged with the threading pin 1a of the threading arm 1 by means of the above-mentioned engaging means (not shown). The driving motor 11 is rotated in the direction opposite to the rotation direction upon the threading operation, so as to rotate the driving arm 6 in the direction of an arrow (clockwise direction).

As described above, in this manner, the guide pin 6a (the bearing 6b) at the tip of the driving arm 6 advances from the disengaging area 7a to the straight portion of the cam groove 7 to swing the threading arm 1 conversely to the above-mentioned direction.

Figure 8:
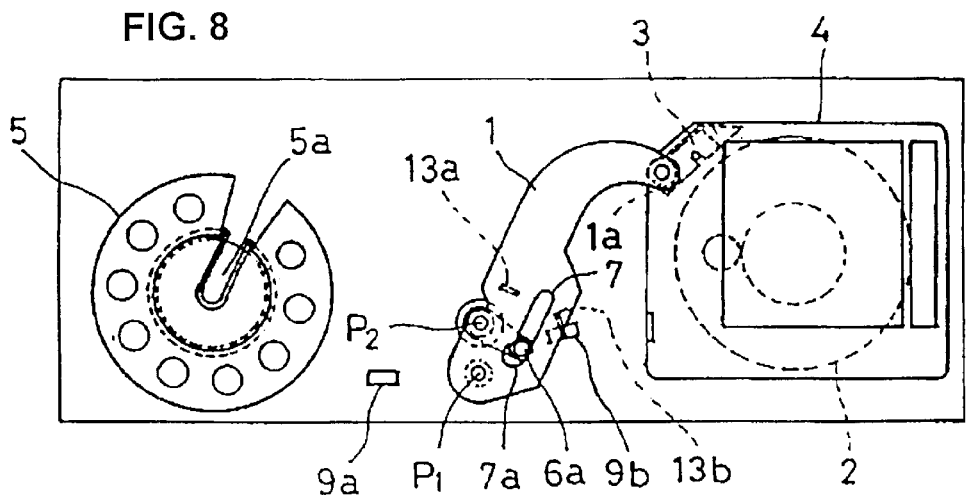
FIG. 8 is an operation-explaining view showing unthreading operation in the present invention.

Thus, as shown in FIG. 8, the leader block 3 is carried to the side of the cartridge 4.

The position sensor 9b detects the flag 13b, and sends signals to the control system so as to instruct the stop of the driving motor 11.

Figure 9:
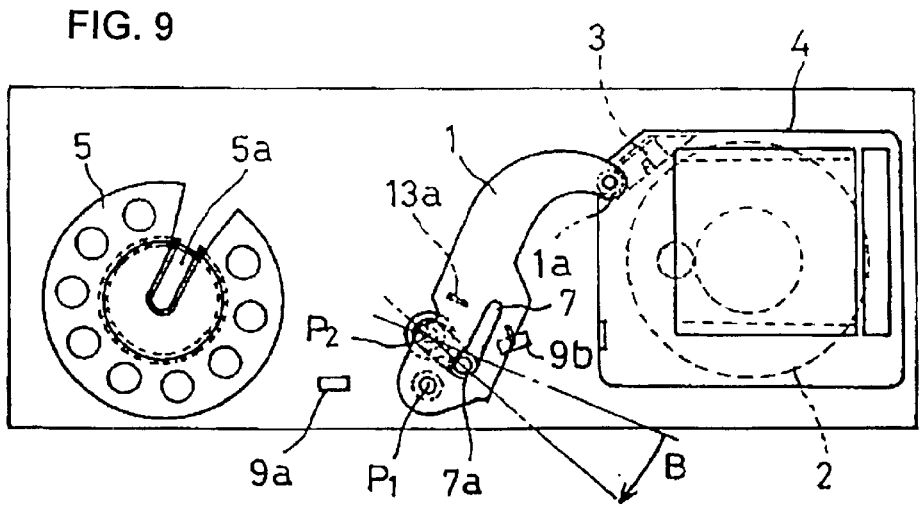
FIG. 9 is an operation-explaining view showing unthreading operation in the present invention.

As shown in FIG. 9, the driving arm 6 is motor-driven so as to be rotated as shown by an arrow B, during this period. However, the guide pin 6a (the bearing 6b) returns from the straight portion of the came groove 7 to the inlet of the disengaging area 7a and further moves into the disengaging area 7a. Therefore, the guide pin 6a is not engaged with the cam groove 7 of the threading arm 1 so that impact force upon sudden stop of the driving motor 11 is not directly applied to the threading arm 1 or the like.

In the state that the leader block 3 is held at the leader block holding position 4a, the above-mentioned engaging means (not shown) is released so that the threading pin 1a is disengaged from the leader block 3. Thus, the cartridge 4 can be taken out.

In this embodiment, the engagement/cooperation and the disengagement/separation of the threading arm 1 and the driving arm 6 are attained by the shape of the cam groove 7 (including the disengaging area 7a) and the guide pin 6a. In short, if there is used any shape or structure wherein the engagement/cooperation with the driving arm 6 can be canceled on the swinging trace of the threading arm 1 and within the range over the stop positions of the leader block 3 in the cartridge 4 and the machine reel 5, the present invention can be realized.

In the above-mentioned embodiment, the stop positions are detected on the swinging trace of the threading arm 1 by means of the position sensors 9a and 9b and flags 13a and 13b. Thereafter, further motor-driving is permitted. Moreover, threading can be carried out after the driving motor becomes a given output state. By detected signals at this time, the control system (not shown) is driven, and the driving motor is stopped by managing time. However, if an encoder is set up to the driving motor, that is, if the position of the driving arm 6 is managed by pulses from the encoder, the driving motor can be stopped at a more precise position.

Furthermore, if the pulses from the encoder are used to control the speed of the driving motor, not only the above-mentioned effect but also such effects that threading speed can be made high can be obtained. This speed control is control during the period when the threading arm moves at a high speed before stop moment thereof while the threading arm swings, and decelerates before the stop moment so as to stop at the stop position. In this way, the threading arm swings at a high speed. When the threading arm stops, the deceleration thereof can be smoothly attained. Moreover, the pulse management is used, so that the threading arm can be stopped at an accurate position.

What is claimed is:

1. A threading apparatus for magnetic tape which comprises:

a leader block provided at an end of said magnetic tape;

a threading arm for carrying said leader block back and forth from a cartridge to a reel; and a driving arm for swinging said threading arm, wherein:

said driving arm swings said threading arm around a pivot point of said threading arm between stop positions where said leader block is stopped in said cartridge and said reel; and said driving arm is motor-driven around a pivoting point of said driving arm, moves together with said threading arm between said stop positions, and swings independently of said threading arm at least one of before said driving arm swings said threading arm between said stop positions and after said driving arm swings said threading arm between said stop positions.

2. The threading apparatus according to claim 1, which further comprises:

a cam groove formed in said threading arm; and a guide pin provided to said driving arm inserted into said cam groove, wherein:

said cam groove and said guide pin are engaged with each other in the swinging direction of said threading arm between said stop positions, and said cam groove includes a disengaging area for canceling the engagement with said guide pin.

3. The threading apparatus according to claim 1, which further comprises position sensors at said stop positions, respectively, wherein:

said position sensors function so as to stop said driving arm.

4. The threading apparatus according to claim 1, wherein the motor for operating said driving arm is a motor with an encoder, and pulses from said encoder control speed of said driving arm and reduce the speed of said driving arm at said stop positions.

5. The threading apparatus according to claim 2, wherein the disengaging area is made by a groove portion extending along the direction tangential to the rotation radius of said driving arm from said guide pin.

6. The threading apparatus according to claim 2, which further comprises position sensors at said stop positions, respectively, wherein:

said position sensors function so as to stop said driving arm.

7. The threading apparatus according to claim 2, wherein the motor for operating said driving arm is a motor with an encoder, and pulses from said encoder control speed of said driving arm and reduce the speed of said driving arm at said stop positions.

\* \* \* \* \*

UNITED STATES PATENT AND TRADEMARK OFFICE
CERTIFICATE OF CORRECTION

PATENT NO.    : 6,513,744 B2
DATED         : February 4, 2003
INVENTOR(S)   : Takeshi Suzuki It is certified that error appears in the above-identified patent and that said Letters Patent is hereby corrected as shown below:

<u>Title page,</u>
Item [*] Notice, should read as follows:
-- [*] Notice:   Subject to any disclaimer, the term of this
                 patent is extended or adjusted under 35
                 U.S.C. 154(b) by 19 days. --.

Signed and Sealed this

Seventeenth Day of February, 2004

JON W. DUDAS
*Acting Director of the United States Patent and Trademark Office*